United States Patent [19]

Carlsson

[11] 4,094,047
[45] June 13, 1978

[54] SNAP SHACKLE

[76] Inventor: Gunilla A. Carlsson, Skidbacken 38, S-172 45, Sundbyberg, Sweden

[21] Appl. No.: 657,314

[22] Filed: Feb. 11, 1976

[30] Foreign Application Priority Data

Feb. 18, 1975 Sweden .................. 7501798

[51] Int. Cl.² .................. A44B 13/00; B64D 17/38
[52] U.S. Cl. .................. 24/241 R; 24/241 SP; 24/232 R; 294/83 R; 24/230 AP
[58] Field of Search .......... 24/230 AV, 230 AP, 232, 24/241 S, 241 SP, 241 R, 241 PS, 240, 233; 294/83, 84

[56] References Cited

U.S. PATENT DOCUMENTS

| 453,877 | 6/1891 | Bonfoey | 24/232 |
| 518,131 | 4/1894 | Beckeman | 294/83 R |
| 1,738,657 | 12/1929 | Lyon | 294/83 R |
| 2,561,017 | 7/1951 | Garrison | 24/232 |
| 2,864,644 | 12/1958 | Marryatt | 294/83 R |
| 3,292,226 | 12/1966 | Foster | 24/239 |
| 3,317,972 | 5/1967 | Harley | 24/239 |
| 3,911,671 | 10/1975 | Guillen | 294/83 R |

FOREIGN PATENT DOCUMENTS 119,448 12/1957 U.S.S.R. .................. 24/230 AP

Primary Examiner—Bernard A. Gelak
Attorney, Agent, or Firm—Flynn & Frishauf

[57] ABSTRACT

A snap shackle has a generally U-shaped closure link, the shanks of which are bridged by at least a part of a fastener body. One of the shanks of the closure link is rotatably and displaceably mounted in the fastener body and the other shank is provided at one end with locking means for engagement with corresponding locking means in the fastener body. The first shank, which is rotatably and displaceably mounted in the fastener body is provided with a pressure surface means which, upon actuation, is displaceable towards the fastener body in order to displace the other shank end away from the fastener body, thereby bringing the locking means on the shank and on the fastener body out of engagement with each other in order to permit the closure link to swivel open relative to the fastener body.

6 Claims, 2 Drawing Figures

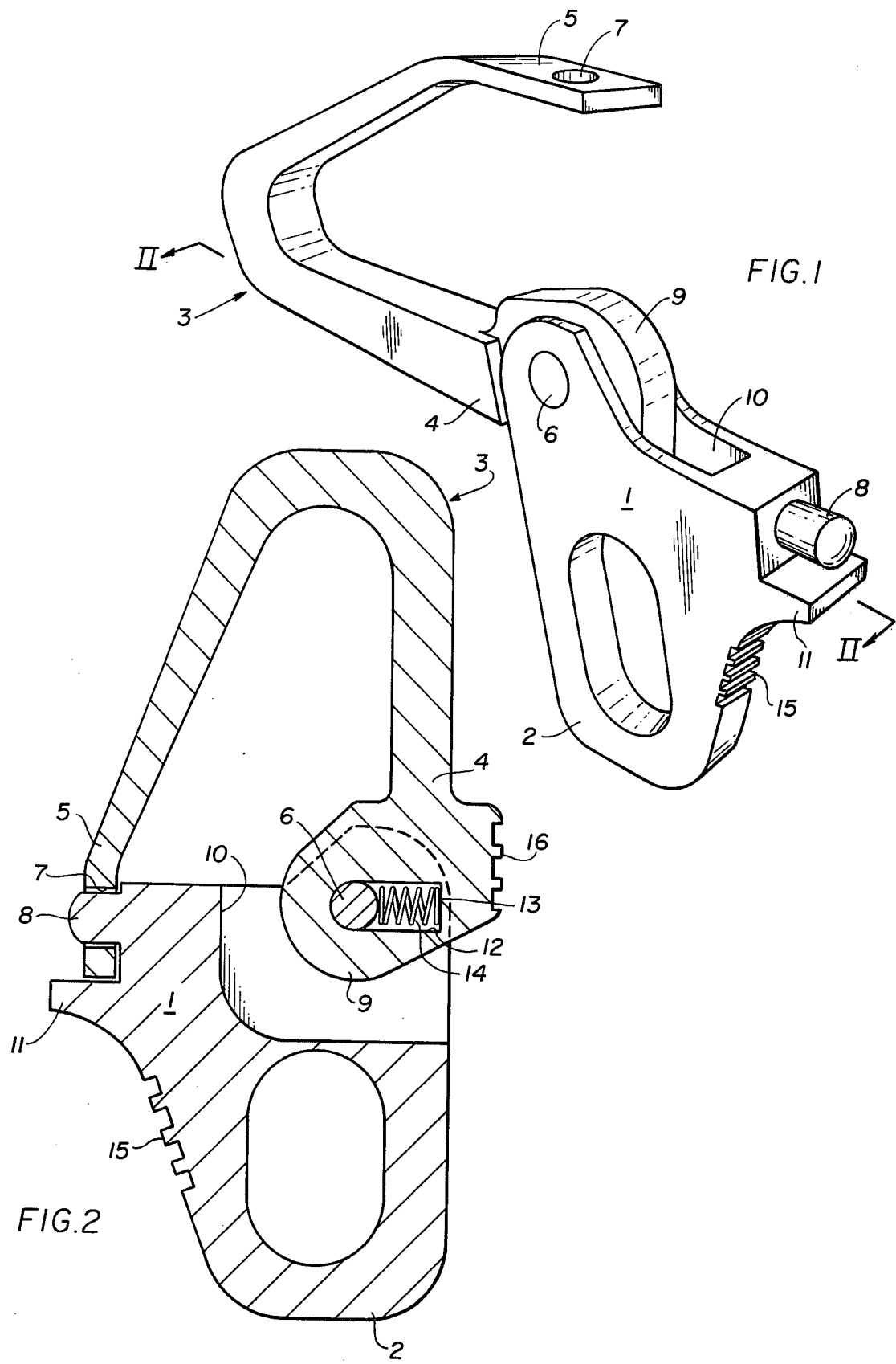

SNAP SHACKLE

The present invention relates to a snap shackle.

Snap shackles to which the present invention pertains generally comprise a fastener body with an openable loop, which is restricted by at least part of the fastener body as well as by a closure link which at one end is rotabably mounted in the body and at the other end is provided with locking means for engagement with corresponding means in the fastener body.

Snap shackles of the abovementioned kind are primarily used on yachts, particularly sailboats, for example to attach sheets to the sheet clew of the sail, falls to fall clews and tacks to tack clews. Conventional snap shackles usually comprise a locking mechanism provided in the body and designed as a spring actuated and throughgoing pin which protrudes from the shackle body and can engage in a recess or hole in the closure link. In order to release the closure the sailor has to use one hand to pull out the pin, which for this purpose is provided with an eye, while the other hand holds the shackle. Thus, in this known design the sailor has to use both hands to open the snap shackle, which can involve certain inconveniencies and dangerous moments, for example if one has to change sails to take them down in hard weather and consequently has no hand free to hold on during the operation of the shackle.

U.S. Pat. No. 3,798,716 discloses a snap fastening device to attach the luff of the jib to the forestay. This known device comprises a closure member in the form of a movable jaw which swivels open around the shaft in the body to allow the insertion and removal of the stay. The jaw is opened by pressing a camming surface on the jaw against the stay and the jaw is automatically closed by spring action. Even if this known structure can be operated with one hand a rather complicated grip function must be used in order to release the stay from the hook. Moreover, the jaw, the fastener body and the locking mechanism form a rather clumsy structure which is complicated, heavy and expensive to produce. Further, this prior locking mechanism does not offer a reliable safety function when the jaw is exposed to great lateral forces.

The present invention relates to a snap shackle, in which these disadvantages have been entirely eliminated, since the shackle can be operated with one hand in a simple manner both at attachment and release. Moreover, the structure is extremely simple and reliable even to extremely high demands on security.

SUMMARY OF THE INVENTION

These objects have been realized according to the invention in a snap shackle substantially characterized in that the closure link has the shape of a U-shaped hook, the shanks of which are bridged by at least part of the fastener body, one of said shanks being at one end rotatably and displaceably mounted in the fastener body, whereas the other shank at one end is provided with locking means for engagement with corresponding means in the fastener body, and that said first shank at its end is provided with a pressure surface which upon actuation is displaceable towards the fastener body, while the other shank end is displaceable away from the fastener body in order to bring the locking means on said other shank end and the fastener body out of engagement with one another, thereby permitting the closure link to swivel open.

The engagement means can be designed as a locking pin firmly connected to the body, which pin in the locked position engages a hole formed in the closure link.

BRIEF DESCRIPTION OF THE DRAWING

An embodiment of the invention will now be described more in detail with reference to the accompanying drawings in which FIG. 1 is a perspective view of a snap shackle according to the invention, in the open position and FIG. 2 is a cross sectional view through the shackle according to FIG. 1, the shackle being in the closed or locked position.

DETAILED DESCRIPTION

As appears from FIG. 1, a snap shackle according to the invention comprises a fastener body 1, which at one end has a closed loop 2, which is to be attached to a halyard, a fall or a sheet. The other end of the fastener body forms part of an openable loop which is restricted by a generally U-shaped closure link 3 with two shank portions 4 and 5, one of which is swivelling around a shaft 6 fixed to the body 1, while the other portion 5 is designed with a through going hole 7 intended to cooperate with a locking pin 8 in the body 1. In FIG. 1, the closure link 3 is shown in an outwards swivelled position with the shackle opened. In the closed and locked position part of the fastener body 1 bridges the shank portions 4 and 5 of the U-shaped closure link 3. In order to guide the closure link 3 during the swivelling movement, the shank portion 4 which is provided as bearing member, is designed with a flange 9, which is introduced into a slot 10 formed in the shackle body 1. The planar guide surfaces of the flange 9 and the opposite faces of the slot 10 will give the link arm good guidance during the swivelling movement and in the locked position.

In FIG. 2 the snap shackle according to the invention is shown with the closure link in the locked position, in which the locking pin 9 is introduced into the hole 7. In order to facilitate the closing operation of the closure link 3, the fastener body 1 is formed with a shoulder 11, against which the end portion of the shank 5 strikes so that the locking pin 8 is safely introduced into the hole 7. As appears from FIG. 2 the second shank 4 of the closure link 3 in the flange portion 9 is designed with a groove 12, through which the shaft 6 is passed and in which a spring 14 is provided between the shaft 6 and the opposite end 13 of the groove 12. As seen from FIG. 2, the longitudinal direction of the locking pin 8 and the groove 12 in the locked position of the closure link 3 are substantially in parallel with one another, which implies that displacement of the closure link 3 against the spring force brings the locking pin 8 out of engagement with the hole 7, whereby the loop can be opened by swivelling the closure link 3 around the shaft 6. For facilitating the displacement of the closure link 3 when opening the shackle the closure link 3 is designed with a pressure surface 16 (FIG. 2), which is actuated by compressive force for displacement of the closure link 3 to released position. In order to facilitate the opening of the shackle with one hand the fastener body 1 is also provided with an opposite gripping or pressure surface 15 and this arrangement makes it possible to open the snap shackle with one hand by pinching the surfaces 15 and 16 which face one another.

The body loop 2 shown in the Figures can of course be given any shape suitable for the intended purpose and it can thus be designed with an open hook at the end opposed to the closure link 3, which hook could be bridged by a transverse bolt or the like. This end could also be designed as a swivel shaft being rotatably retained in a corresponding hole in a ring fastener.

What I claim is:

1. Snap shackle comprising:

a stationary fastener body (1) provided with attachment means (2) and locking means (8), and having a slot (10) therein;

a generally U-shaped closure link (3) rotatably mounted to said fastener body (1) via a shaft (6) and rotatable through an angle of about 90 degrees relative to said fastener body (1), said fastener body (1) and said closure link (3) together defining an openable loop which is restricted by at least part of said fastener body (1) and by at least part of said closure link (3), said openable loop being separated from said attachment means (2);

said generally U-shaped closure link (3) having first and second longitudinally extending shanks (4,5) which are adapted to be bridged by at least part of said fastener body (1), said first shank (4) being at one end rotatably and linearly laterally displaceably mounted in said fastener body (1) via said shaft (6), said one end of said first shank being further provided with bearing means (9) which is guided in said slot (10) to permit rotational movement of said first shank through an angle of about 90 degrees as well as linear and lateral displacement of said first shank relative to said fastener body (1), and said second shank (5) at one end being provided with locking means (7) for selective engagement with said locking means (8) of said fastener body (1), said locking means being disengagable by a lateral movement of said link relative to said fastener body;

said shaft (6) being fixedly connected to one of said fastener body and closure link (3), an elongated laterally disposed groove (12) being provided in the other of said fastener body (1) and closure link (3), said shaft (6) passing through said groove (12), and wherein a spring (14) is arranged in said groove (12) between said shaft (6) and one end of said groove (12) to bias said shaft (6) toward the other end of said groove (12) and to permit said linear lateral displacement of said closure link (3) relative to said fastener body (1);

said first shank (4) at its said one end being further provided with a manually engagable first pressure surface (16) extending outwardly of said fastener body (1) in the lateral direction of said U-shaped closure link (3), said fastener body (1) having a manually engagable second pressure surface (15) on the opposite side of said shaft (6) and spaced laterally and longitudinally away from said shaft (6) in the direction away from the closure link (3), said first pressure surface (16) facing away from said second pressure surface (15) and said pressure surfaces being oriented for application of a compressive force therebetween to simultaneously laterally displace and rotate said closure link (3) in the opening direction relative to said fastener body (1), whereby upon manual application of a compressive force substantially perpendicular to said pressure surfaces said first pressure surface (16) is displaceable towards said fastener body (1) to displace said one end of said second shank (5) away from said fastener body (1) to bring said locking means (7) of said second shank (5) and said locking means (8) of said fastener body (1) out of engagement with one another, thereby permitting said closure link (3) to rotate at least partially under the influence of said compressive force through an angle of about 90 degrees relative to said fastener body (1) to an open position to open said openable loop.

2. Shackle according to claim 1, wherein said shaft (6) is fixedly connected to said fastener body (1) and said elongated laterally disposed groove (12) is provided in said closure link (3).

3. Shackle according to claim 2, wherein said locking means of said fastener body (1) comprises a laterally extending locking pin (8) fixedly connected to said fastener body (1), and said locking means of said closure link comprises a recess or hole (7) in said second shank (5), said pin (8) being arranged to engage said recess or hole (7) in said closure link (3) when said closure link (3) is rotated into its locked position.

4. Shackle according to claim 3, wherein said locking pin (8) and said groove (12) in the locked position of said closure link (3) are substantially in parallel with one another, whereby displacement a certain distance of said closure link (3) against the spring force brings said locking pin (8) out of engagement with said recess or the hole (7) in said closure link (3).

5. Shackle according to claim 1, wherein said locking means of said fastener body (1) comprises a laterally extending locking pin (8) fixedly connected to said fastener body (1), and said locking means of said closure link comprises a recess or hole (7) in said second shank (5), said pin (8) being arranged to engage said recess or hole (7) in said closure link (3) when said closure link (3) is rotated into its locked position.

6. Shackle according to claim 1, wherein said locking means (7) of said closure link comprises a through hole (7) therein.

* * * * *